United States Patent [19]
Castelaz

[11] Patent Number: 5,150,323
[45] Date of Patent: Sep. 22, 1992

[54] ADAPTIVE NETWORK FOR IN-BAND SIGNAL SEPARATION

[75] Inventor: Patrick F. Castelaz, Yorba Linda, Calif.

[73] Assignee: Hughes Aircraft Company, Los Angeles, Calif.

[21] Appl. No.: 392,681

[22] Filed: Aug. 11, 1989

[51] Int. Cl.$^5$ .................. G06G 7/00; G06G 7/60; G10L 3/00; G06K 9/62
[52] U.S. Cl. ..................... 364/807; 395/23; 395/24; 395/2; 381/46; 382/14
[58] Field of Search ............... 364/807, 513; 307/201; 395/2, 22, 23, 24; 382/14, 15; 381/46, 47, 71, 94

[56] References Cited
U.S. PATENT DOCUMENTS

| | | |
|---|---|---|
| 3,287,649 | 11/1966 | Rosenblatt . |
| 4,660,166 | 4/1987 | Hopfield . |
| 4,719,591 | 1/1988 | Hopfield et al. . |
| 5,003,490 | 3/1991 | Castelaz et al. ............ 364/513 |

OTHER PUBLICATIONS

Lippmann, Richard P., "An Introduction to Computing with Neural Nets", IEEE ASSP Magazine, Apr. 1987, pp. 4–22.
Rumelhardt, D. E., Hinton, G. E. and Williams, R. J., "Learning Internal Representations by Error Propagation", Parallel Distributed Processing Explorations in the Microstructure of Cognition, vol. 1, Chapter 8, pp. 318-362, date (unknown).
Chien, D., Featherston, M., Min, K., and Rogers, C., "Speech Separation with Neural Networks", 1988.
Rogers C., Chien, D., Featherston, M., and Min, K., "Neural Network Enhancement for a Two Speaker Separation System".
P. D. Wasserman above, T. Schwartz, "Neural Networks, Part II: What are They and Why is Everybody so Interested in Them Now?", I.E.E.E. Expert, 3, (1988), No. 1, pp. 10-15.
C. A. Will, "The DARPA Neural Network Study", Neural Network Review, vol. 2, No. 3, (1988), pp. 74–85.
D. Schwartz, M. Jurik, "Neural Nets on a Personal Computer—PC Neural Network Products Come of Age", PC AI, Nov./Dec. (1988), p. 37.
A. Bayle, "Learning in Neural Networks", PC AI, Nov./Dec. (1988), p. 40.
P. D. Wasserman, "Neural Computing Theory and Practice", Chapter 3, p. 43, (Van Nostrand Reinhold), Apr. (1989).
NeuralWare Inc. Brochure, "NeuralWorks Explorer", (1988).
M. Caudill, "Neural Networks Primer—Part II", AI Expert, p. 53, Jun. (1988).
M. Caudill, "Neural Networks Primer—Part III", AI Expert, p. 53, Jun. (1988).
"Brainmaker—Users Guide and Reference Manual", California Scientific Software, (1989), p. 303.
J. Stanley, "Introduction to Neural Networks", pp. 119-133, 191-235 and 247, California Scientific Software, (1989).

Primary Examiner—Jerry Smith
Assistant Examiner—Jim Trammell
Attorney, Agent, or Firm—Wanda K. Denson-Low

[57] ABSTRACT

An Adaptive Network For In-Band Signal Separation (26) and method for providing in-band separation of a composite signal (32) into its constituent signals (28), (30). The input to the network (26) is a series of sampled portions of the composite signal (32). The network (26) is trained with at least one of said composite signals (28) (30) using a neural network training paradigm by presenting one or more of the constituent signals (28) (30) to said network (28). The network (26) may be used to separate multiple speech signals from a composite signal from a single sensor such as a microphone.

13 Claims, 8 Drawing Sheets

ADAPTIVE NETWORK FOR IN-BAND SIGNAL SEPARATION

BACKGROUND OF THE INVENTION

1. Technical Field

This invention relates to signal processing techniques and, more particularly, to a method and apparatus for separating in-band signals.

2. Discussion

In-band signal separation of complex composite signals is an extremely difficult signal processing problem. In-band separation problems are encountered in situations where a single complex composite signal composed of individual constituent signals must be separated into their original components. In one example, known as the "cocktail party" problem, multiple speech signals may be received by a single sensor and it is desired to separate out the voices of individual speakers. Other examples include decomposition of complex composite radar or o sonar signals emitted from multiple sources and received at a single receiver. In addition, two-dimensional problems may present similar signal separation problems. These include object detection and identification of image data in which multiple overlapping (in-band) additive sources are present. In particular, with respect to image data, objects of interest may overlap within the intensity and frequency bands of the sensor, and it is desired to separate these overlapping images.

Conventional approaches to in-band signal separation require extensive front end analysis and design in the development of feature extraction and filtering algorithms. Specifically, conventional techniques typically involve extensive preprocessing. Such preprocessing may require, for example, measuring pulse width, amplitude, rise and fall times, frequency, etc. Once these features are extracted, they can be matched with stored patterns for classification, identification and generation of the separated output signals. However, the software required to accomplish these steps is often complex and is time-consuming to develop. Moreover, conventional processors are often not capable of separating in-band signals satisfactorily. In addition, conventional digital signal processors are not able to tolerate certain variations in the input signal, such as changes in orientation of a visual pattern, or differences in speakers, in the case of speech recognition.

In recent years it has been realized that conventional Von Neumann computers, which operate serially, bear little resemblance to the parallel processing that takes place in biological systems such as the brain. It is not surprising, therefore, that conventional signal processing techniques should fail to adequately perform the tasks involved in human perception. Consequently, new methods based on neural models of the brain are being developed to perform perceptual tasks. These systems are known variously as neural networks, neuromorphic systems, learning machines, parallel distributed processors, self-organizing systems, or adaptive logic systems. Whatever the name, these models utilize numerous nonlinear computational elements operating in parallel and arranged in patterns reminiscent of biological neural networks. Each computational element or "neuron" is connected via weights or "synapses" that typically are adapted during training to improve performance. Thus, these systems exhibit self-learning by changing their synaptic weights until the correct output is achieved in response to a particular input. Once trained, neural nets are capable of recognizing a target and producing a desired output even where the input is incomplete or hidden in background noise. Also, neural nets exhibit greater robustness, or fault tolerance, than Von Neumann sequential computers because there are many more processing nodes, each with primarily local connections. Damage to a few nodes or links need not impair overall performance significantly.

There are a wide variety of neural net models utilizing various topologies, neuron characteristics, and training or learning rules. Learning rules specify an internal set of weights and indicate how weights should be adapted during use, or training, to improve performance. By way of illustration, some of these neural net models include the Perceptron, described in U.S. Pat. No. 3,287,649 issued to F. Rosenblatt; the Hopfield Net, described in U.S. Pat. Nos. 4,660,166 and 4,719,591 issued to J. Hopfield; the Hamming Net and Kohonen self-organizing maps, described in R. Lippman, "An Introduction to Computing with Neural Nets", IEEE ASSP Magazine, April 1987, pages 4-22; and "The Generalized Delta Rule for Multilayered Perceptrons", described in Rumelhart, Hinton, and Williams, "Learning Internal Representations by Error Propagation", in D. E. Rumelhart and J. L. McClelland (Eds.), Parallel Distributed Processing; Explorations in the Microstructure of Cognition. Vol. 1: Foundation. MIT Press (1986).

While each of these models achieve varying degrees of success at the particular perceptual tasks to which it is best suited, the parallel inputs required by these systems are thought to necessitate special purpose preprocessors for real time hardware implementations. (See the above-mentioned article by R. Lippman.) For example, in Rosenblatt's Perceptron, (U.S. Pat. No. 3,287,649) each input receives a separate frequency band of an analog audio signal. Thus, while neural networks reduce the amount of algorithm development required to analyze a signal, the representation of the in-band signal separation problem to a neural network would still require extensive preprocessing to present the signal to the conventional neural network.

Thus, it would be desirable to provide a system for accomplishing in-band signal separation which does not require extensive algorithm and software development, but, which instead, can develop its own algorithm without requiring the algorithm to be explicitly defined in advance. It would also be desirable to provide an in-band signal separation processor which can handle significant variations in the data and is also fault tolerant. It is further desirable to provide an in-band signal separation processor which can accept raw (e.g., time—amplitude) signal data with a minimum of preprocessing.

SUMMARY OF THE INVENTION

In accordance with the teachings of the present invention, an adaptive network for in-band signal separation accepts as direct input, discrete portions of a composite signal. The adaptive network is trained by presenting a training composite signal as input to the input neurons and by presenting a desired output to selected groups of its output neurons. This desired output consists of one or more of the constituent signals contained in the composite training input signal. The training continues until the adaptive network produces the desired output in response to a known composite signal.

The adaptive network may then be used to separate constituent signals from an unknown composite signal, if one of the constituent signals has characteristics in common with the constituent signal used to train the network.

BRIEF DESCRIPTION OF THE DRAWINGS

The various advantages of the present invention will become apparent to those skilled in the art after reading the following specifications and by reference to the drawings in which:

FIG. 2 (a–b) are graphs illustrating a conventional signal separation technique;

FIG. 3 (a–b) are graphs of the conventional and neural network approaches to the in-band signal separation problem;

DESCRIPTION OF THE PREFERRED EMBODIMENTS

Figure 2A:
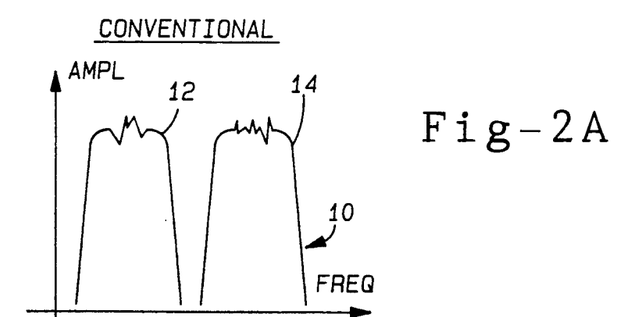
Figure 2B:
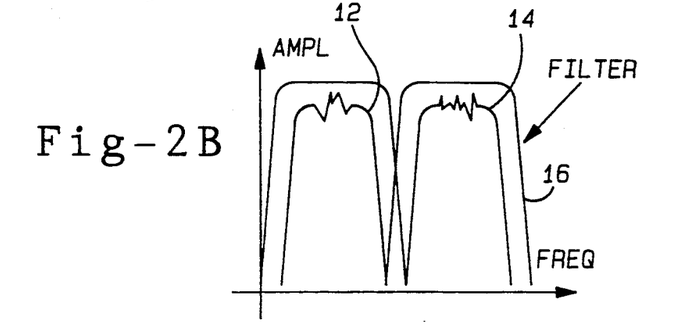

In accordance with the teachings of the present invention, a method and apparatus is provided for separating an in-band composite signal into its constituent signals. Referring now to FIG. 2A, there is shown a composite signal 10 which includes two constituent signals 12 and 14. The graph in FIG. 2A shows the signals 12 and 14 with the amplitude plotted as a function of frequency. It will be appreciated that the signals may also be represented in other ways, such as in the time, instead of the frequency domain. Where composite signals can be separable, such as by different frequency bands, as shown in FIG. 2A, conventional filtering techniques can be used to separate the two signals. As shown in FIG. 2B, a filter 16 can be applied to the first and second signals 12 and 14 to accomplish signal separation. In particular, the filter 16 has two discrete regions in which it permits signals to pass. In the first region, the first signal 12 is passed and all other signals having other frequencies are filtered out. In the second region, the second signal 14 is permitted to pass while other frequency regions are filtered out.

Figure 3A:
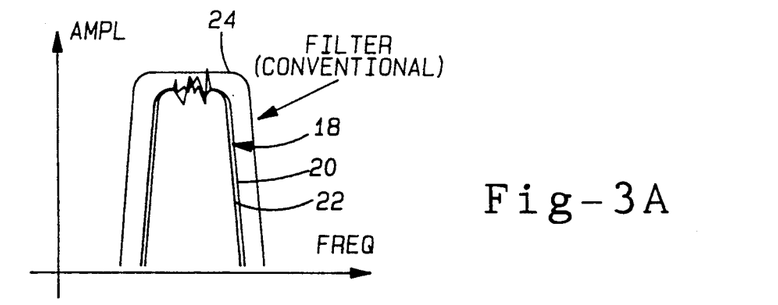

Referring now to FIG. 3A, the in-band signal separation problem is presented. In this example, the composite signal 18 is comprised of constituent signals 20 and 22 which are overlapping (e.g., "in-band") in the frequency domain. In this case a conventional filter 24 will be unable to separate the signals 20 and 22. More sophisticated filtering techniques would require an extensive analysis and design effort to develop feature extraction and filtering algorithms. Also, the execution of these algorithms would be slow even using state-of-the-art conventional signal processors. Moreover, conventional techniques often do not separate the two signals to a satisfactory degree, and the resulting composite signals are thus not true representations of the original constituents.

Figure 3B:
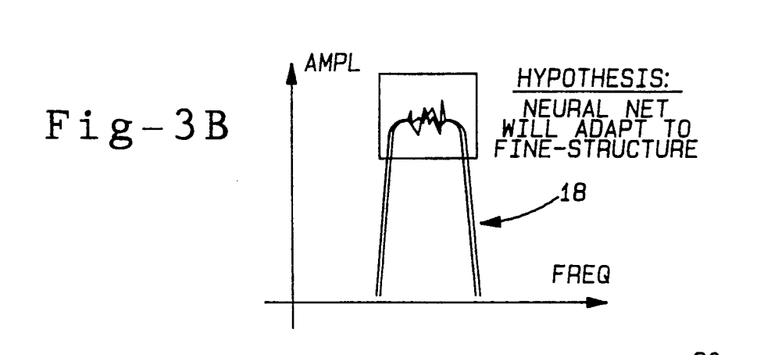

Referring now to FIG. 3B, the approach of present invention is illustrated. In particular, the present invention is based on the discovery that a neural network can adapt to the fine structure of a composite signal 18 to perform in-band signal separation when the neural network is presented and trained with the signals in accordance with certain teachings within the scope of the present invention.

Figure 1:
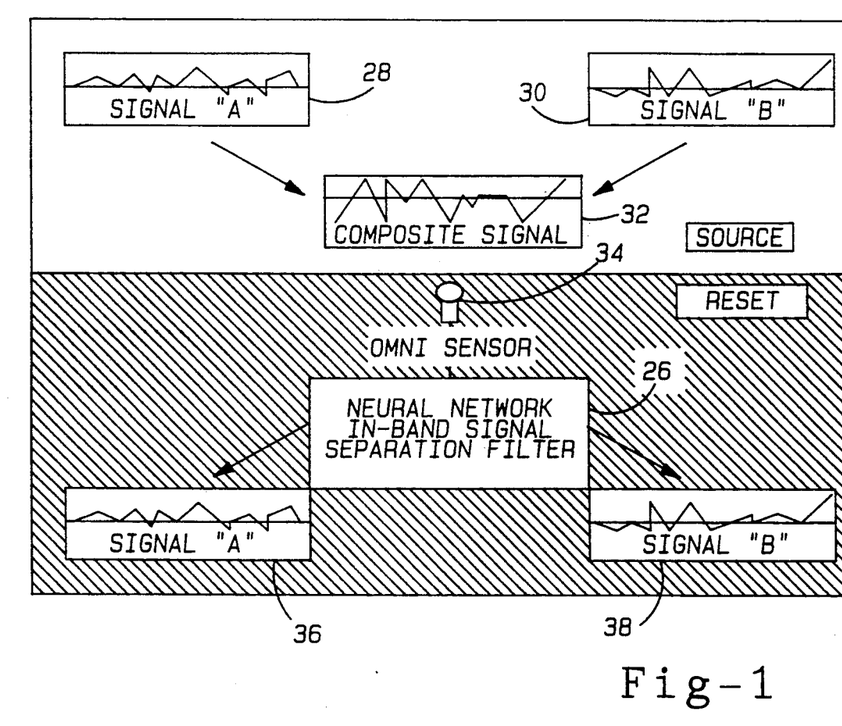
FIG. 1 is an overview of the in-band signal separation problem.

Referring now to FIG. 1, the overall functions of an adaptive network for in-band signal separation 26 according to the present invention is shown. Constituent signals 28 and 30 are combined into a composite signal 32 at the signal source. For example, these signals may comprise speech, radar, sonar, optical or other various signals. In accordance with the preferred embodiment of the present invention, the signals may be speech signals originating from two speakers and the composite signal is sensed by a microphone 34. Microphone 34 responds to both the first signal 28 and the second signal 30 and generates a composite electrical signal 32. This signal is sent to the adaptive network for in-band signal separation 26 which produces two outputs; the first output 36 is a faithful reproduction of the original first signal 28; and a second output signal 38, is a faithful reproduction of the original second input signal 30.

Figure 4:
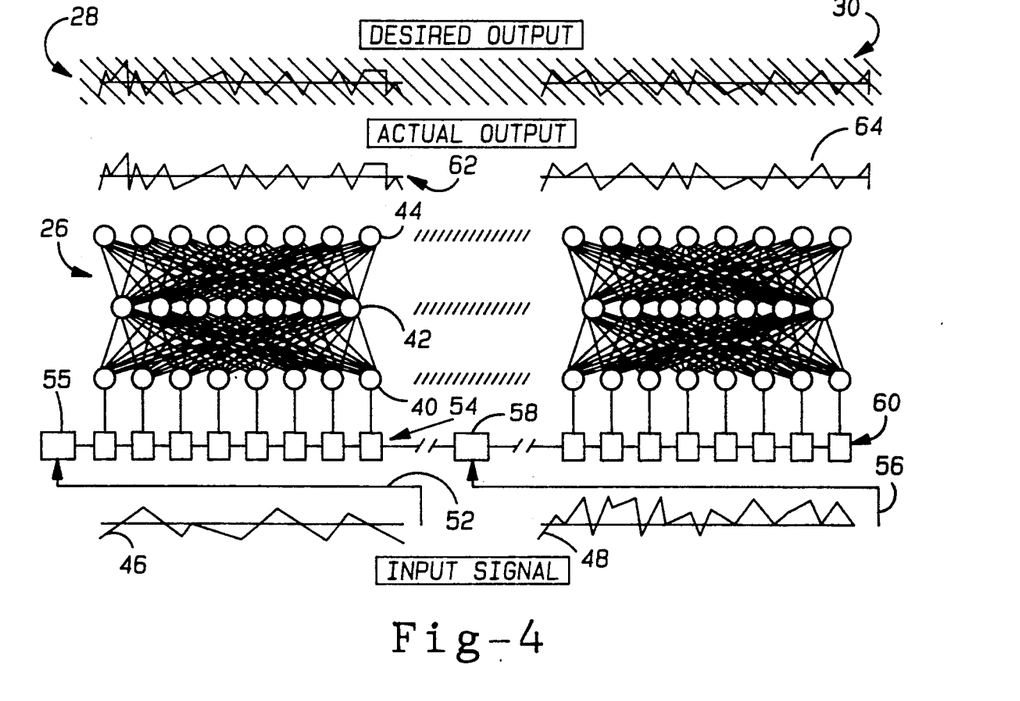
FIG. 4 is a graphical illustration of the adaptive network for in-band signal separation in accordance with the techniques of the present invention.
Figure 10:
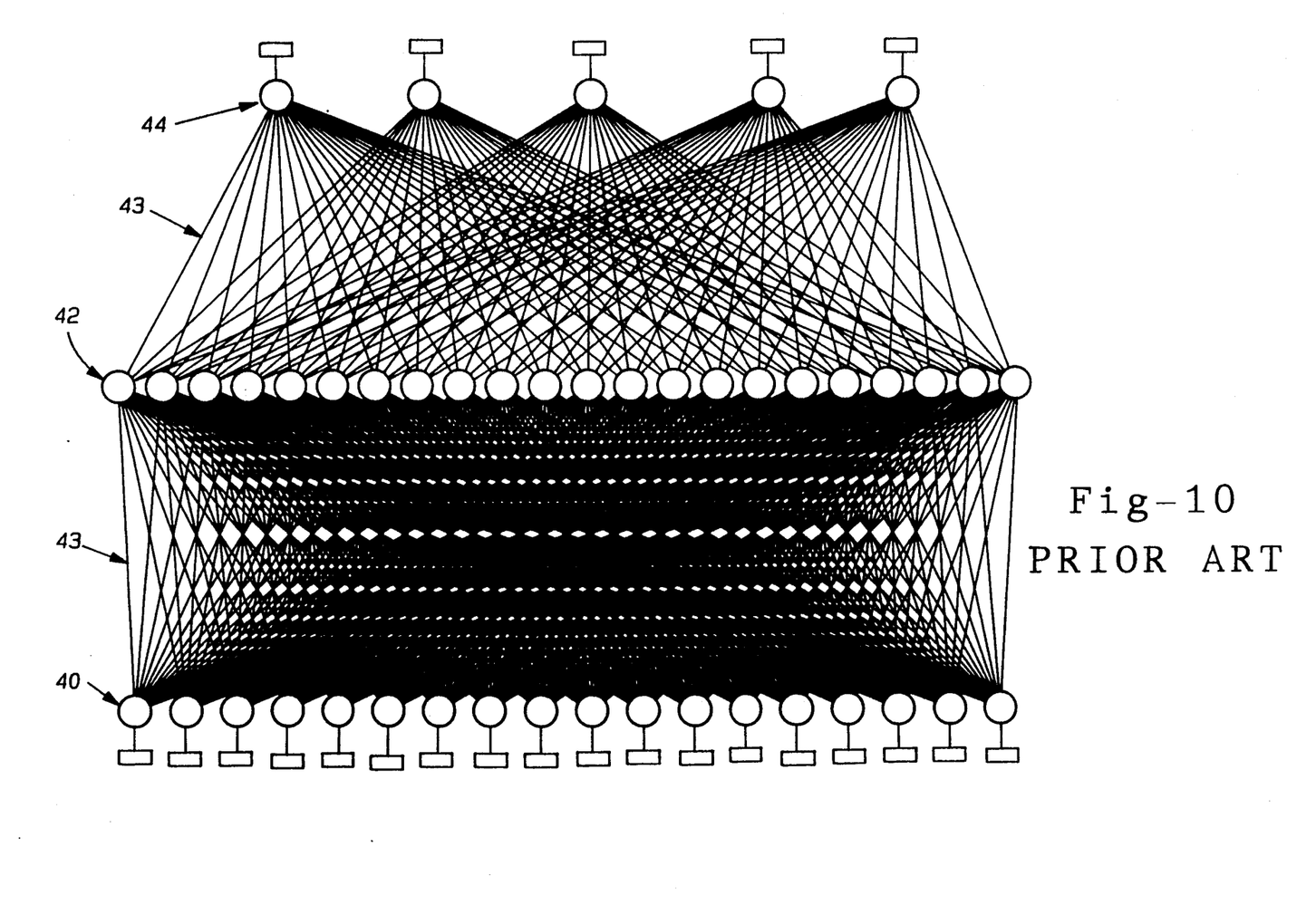
FIG. 10 is an illustration of a multilayer perceptron in accordance with the prior art.

Referring now to FIG. 4, the adaptive network for in-band signal separation 26 is shown in accordance with the preferred embodiment of the present invention. The neural network employed in the preferred embodiment utilizes a neural network known as a multilayer perceptron. As shown in FIG. 10, a multilayer perceptron includes a layer of input neurons 40, one or more layers of inner neurons 42, and a layer of output neurons 44. Ordinarily, in a multilayer perceptron each neuron in each layer is connected to each neuron in the adjacent layers by means of synaptic connections 43 as shown in FIG. 10. Alternatively, the particular interconnection scheme and training algorithm employed, may be according to a number of other neural network architectures including, but not limited to, the Boltzman machine, Counterprop, Hopfield net, Hamming net, etc. It is preferable that the neural network architecture and training algorithm employed belong to the class of supervised, as opposed to unsupervised nets. The particular interconnection scheme and training algorithm employed with the multilayer perceptron and its associated learning algorithm, known as backward error propagation, are well known. Details of the multilayer perceptron are described in Rumelhart, Hinton, and Williams, "Learning Internal Representations by Error of Propagation", in D. E. Rumelhart and J. L. McClelland (Eds.), Parallel Distributed Processing; Explorations in the Microstructure of Cognition, Vol. 1 Foundations, M.I.I. Press (1986), which is incorporated herein by reference.

In accordance with the preferred embodiment, a low frequency composite signal 46 and a high frequency composite signal 48 are both transmitted to the input neurons 40 in the adaptive network 26. The use of the low frequency 46 and high frequency 48 versions of the composite signal 32 permit a reduced number of input neurons 40 to be employed. A large number of inputs is generally considered to be necessary. This is because a high frequency representation of the signal is needed to get a faithful reproduction of the fine structure of the signal; and a broader or lower frequency representation is also needed to give the processor 26 information about more fundamental frequencies, (e.g., pitch) of the speaker. That is, the network should have available the high frequency structure which contains, for example, words and phonemes and the low frequency structure, which contains, for example, the pitch that is characteristic of a given speaker. Thus, one way to give the processor 26 this information is to employ a large number of input neurons 40. This may require, for example, two hundred or more input neurons 40 to give a broad enough sample of the speech data.

Figure 9:
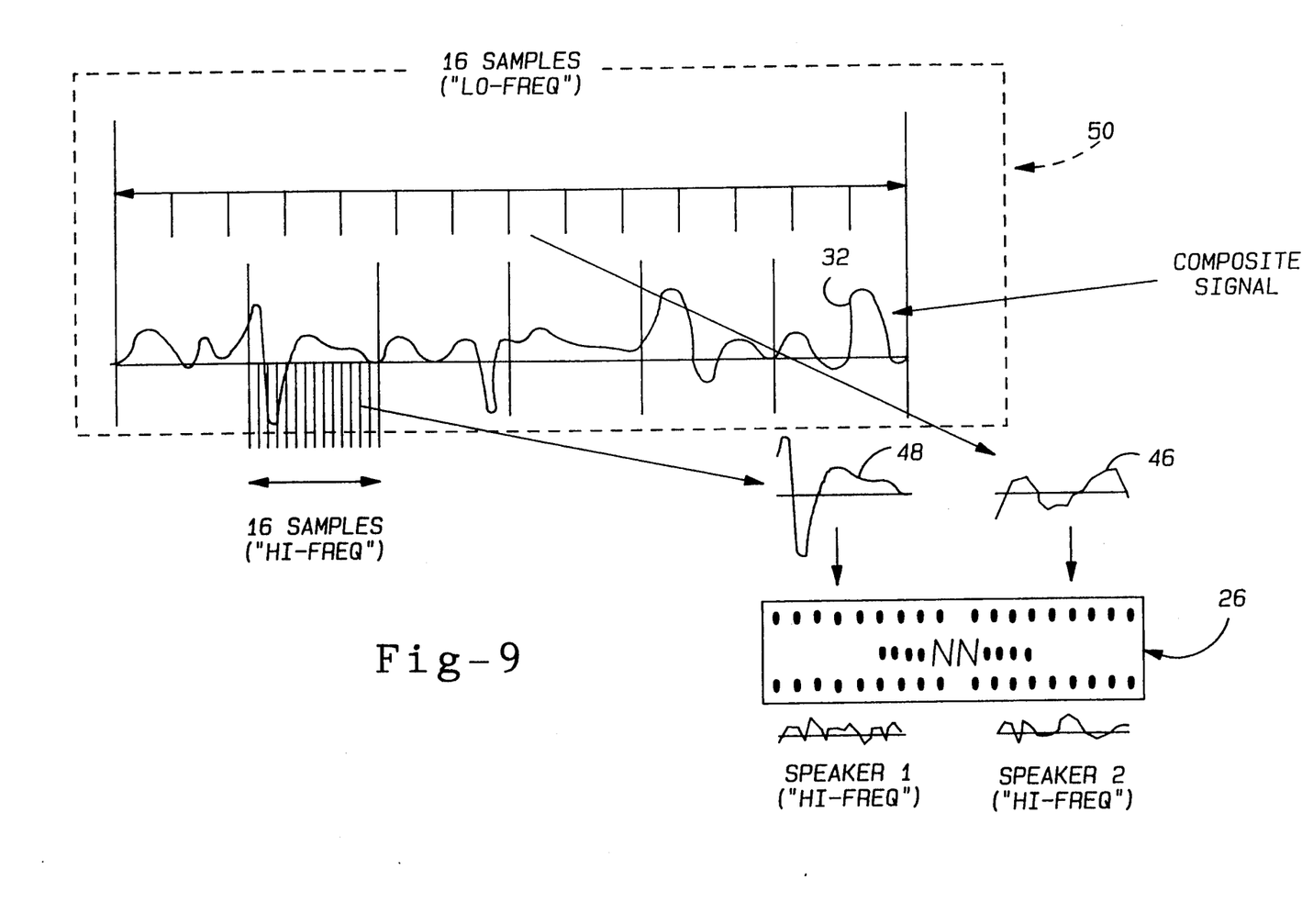
FIG. 9 is an illustration of the sampling technique in accordance with the preferred embodiment of the present invention.

In accordance with the preferred embodiment of the present invention, the necessary high and low frequency information can be given to the processor 26 by means of a filter circuit 50 shown in FIG. 9. The filter circuit 50 accepts as input the composite speech signal 32 and generates a high frequency output 48 and a low frequency output 46. It will be appreciated by those skilled in the art that known filtering and sampling techniques may be employed to accomplish the functions of the filtering circuit 50. In accordance with the preferred embodiment, the composite signal 32 is divided into 16 samples at a low frequency, for example, 640 Hertz(Hz). Thus, a sample is taken every 25.6 milliseconds. When added together those samples generate the low frequency composite signal 46. The high frequency samples on the other hand are taken every 1.6 milliseconds, at a rate of 10 kilohertz. Sixteen of the high frequency samples, when combined, generate the high frequency input composite signal 48.

Referring again to FIG. 4, the low frequency composite signal 46 is fed along input line 52 to a series of sampling circuits 54 through an input buffer 55. The low frequency composite signal 46 is fed through the input line 52, to a buffer circuit 55 and the sampling circuits 54 until each of the 16 samples reside in a single sampling circuit 54. Each sampling circuit 54 is connected to an input neuron 40 in the input layer of the processor 26. In similar fashion, the high frequency composite signal 48 is transmitted through an input line 56 through input buffer 58 to a series of sampling circuits 60. It should be noted that while only eight sampling circuits 60 and 8 sample circuits 54 are shown in FIG. 4, there would actually be 16 of the high frequency sampling circuit 60 and 16 of low frequency sample circuits 54, each connected to an input neuron 40. It will be appreciated that depending on the specific application, more or less than 16 samples may be used. Also, the network could be configured to handle more than 2 speakers.

In order to train the processor 26 to perform in-band signal separation, the composite signal 32 consists of a training input signal, which is composed of two known constituent signals such as the first and second constituent signal 28 and 30 shown in FIG. 1. When 16 low frequency and 16 high frequency samples of the composite training signal 32 are fed from the sample circuits 54 and 60 to the input neurons 40, the processor 26 will produce an output at each of its output neurons 44. In accordance with the conventional back-prop training technique employed in the preferred embodiment, the processor 26 is trained with a desired output consisting of high frequency representations of the two constituent signals 28 and 30. In particular, the first 16 output neurons may be presented with the first constituent signal 28 and the next 16 output neurons may be presented with the second constituent signal 30 during training. After a sufficient number of training sessions, the actual output 62, 64 will approximate the desired output. In particular, the first 16 output neurons 44 will approximate the first constituent signal 28 and the next 16 output neurons will approximate the second constituent signal 30. Alternatively, the processor 26 could be trained with only a single training input such as constituent signal 28 for cases where only a single constituent signal is desired. However, where only a single signal is provided by the processor 26, it will be appreciated that this single signal may be separated from the composite and the remaining signal may yield a second constituent signal.

It should also be noted that once the processor 26 is trained for the first 16 high frequency samples and the first 16 low frequency samples, training may continue by repeating the training procedure for the next consecutive 16 high frequency samples, by shifting the high frequency signal over by an amount equal to the distance of 16 high frequency samples. The processor 26 is again trained with this input, until the desired output is achieved to within a predetermined tolerance. This procedure can then be repeated a number of times which will depend on the complexity of the signal and the neural network architecture employed.

Once the network is trained, an unknown composite signal can be presented to the input neurons 40 in the same manner as the training composite signal. That is, a low frequency representation 46 and a high frequency representation 48 of the unknown composite signal is presented to 16 of the input neurons 40 respectively. If the unknown composite signal contains constituent signals 28 and 30, the output of the processor 26 will consist of the first constituent signal 28 from the first 16 output neurons 44 and the second constituent signal 30 from the next 16 output neurons 44. A slower but alternative technique which may be useful in certain applications would be to shift the data over by one high frequency sample at a time rather than 16 samples between training sessions.

Figure 5:
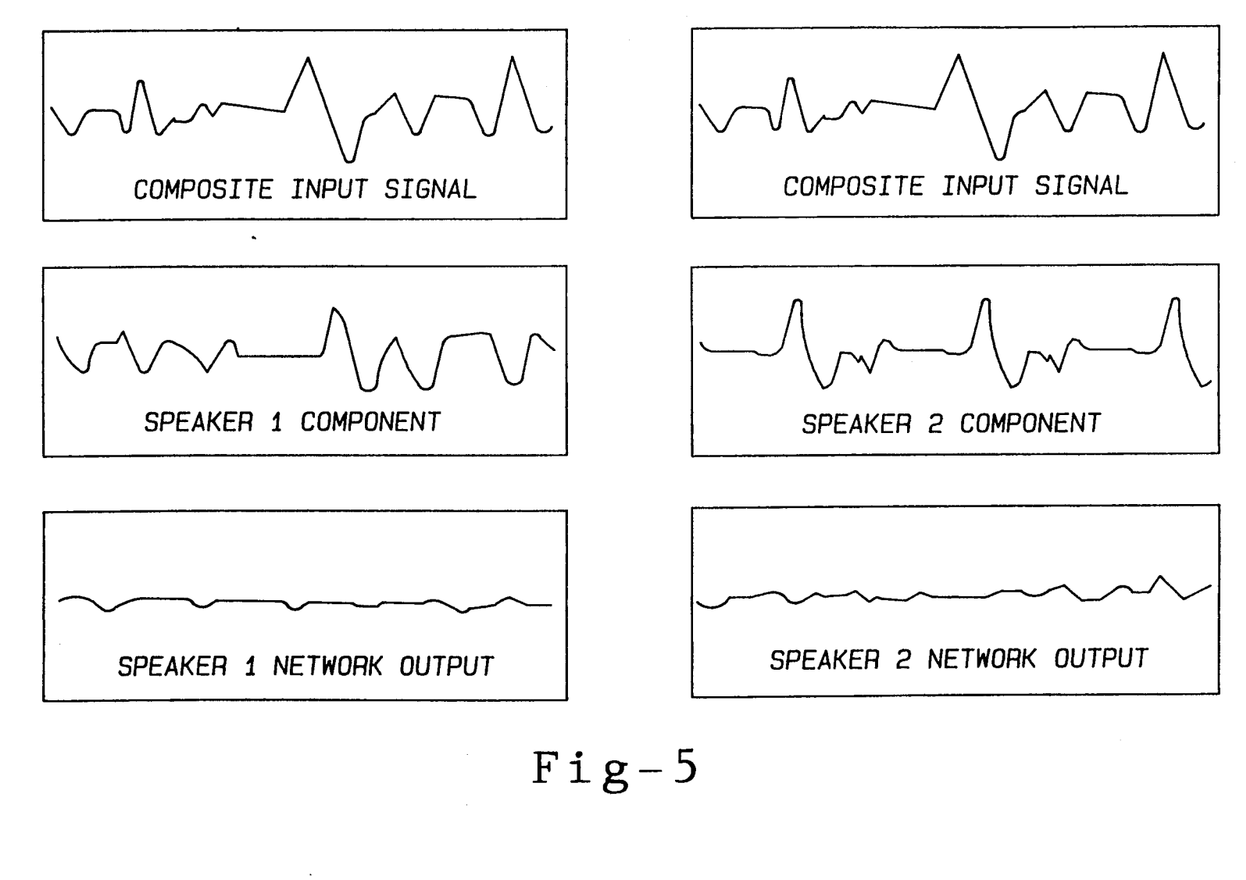
FIG. 5 is graphical illustration of the results of the adaptive network for in-band signal separation in accordance with the present invention after one training cycle.

Referring now to FIGS. 5-8, illustrations of the output of the adaptive network 26 at various stages in training is shown. In FIG. 5 the "composite input signal" is shown twice in the top row. This composite signal is comprised of signals from two individual speakers, labelled "Speaker 1 Component" and "Speaker 2 Component", shown in the second row. For example, the composite signal may be signal from a microphone responding to two persons (speaker 1 and speaker 2) talking simultaneously. The composite signal is fed to the adaptive network 26 and the network is trained with the known speaker 1 and speaker 2 examples, in accordance with the techniques described above. After one training cycle, the output of the adaptive network 26 appears as shown in the third row of FIG. 5. That is, the output neurons trained with the speaker 1 component produce output signals labelled "Speaker Network Output" and the output neurons trained with the speaker 2 component produce output signals labeled "Speaker 2 Network Output".

Figure 6:
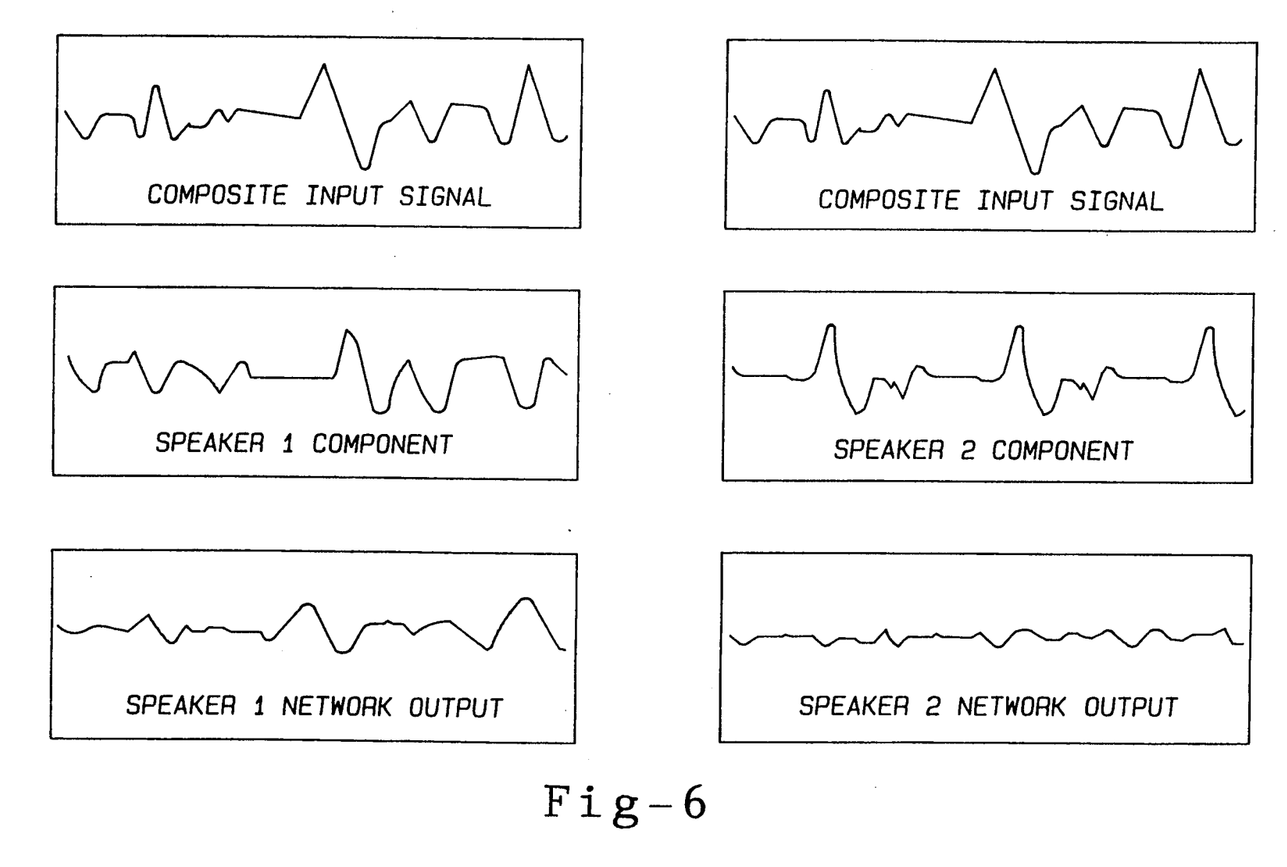
FIG. 6 is a graphical illustration of the results of the adaptive in-band network for a signal separation after ten training cycles.
Figure 7:
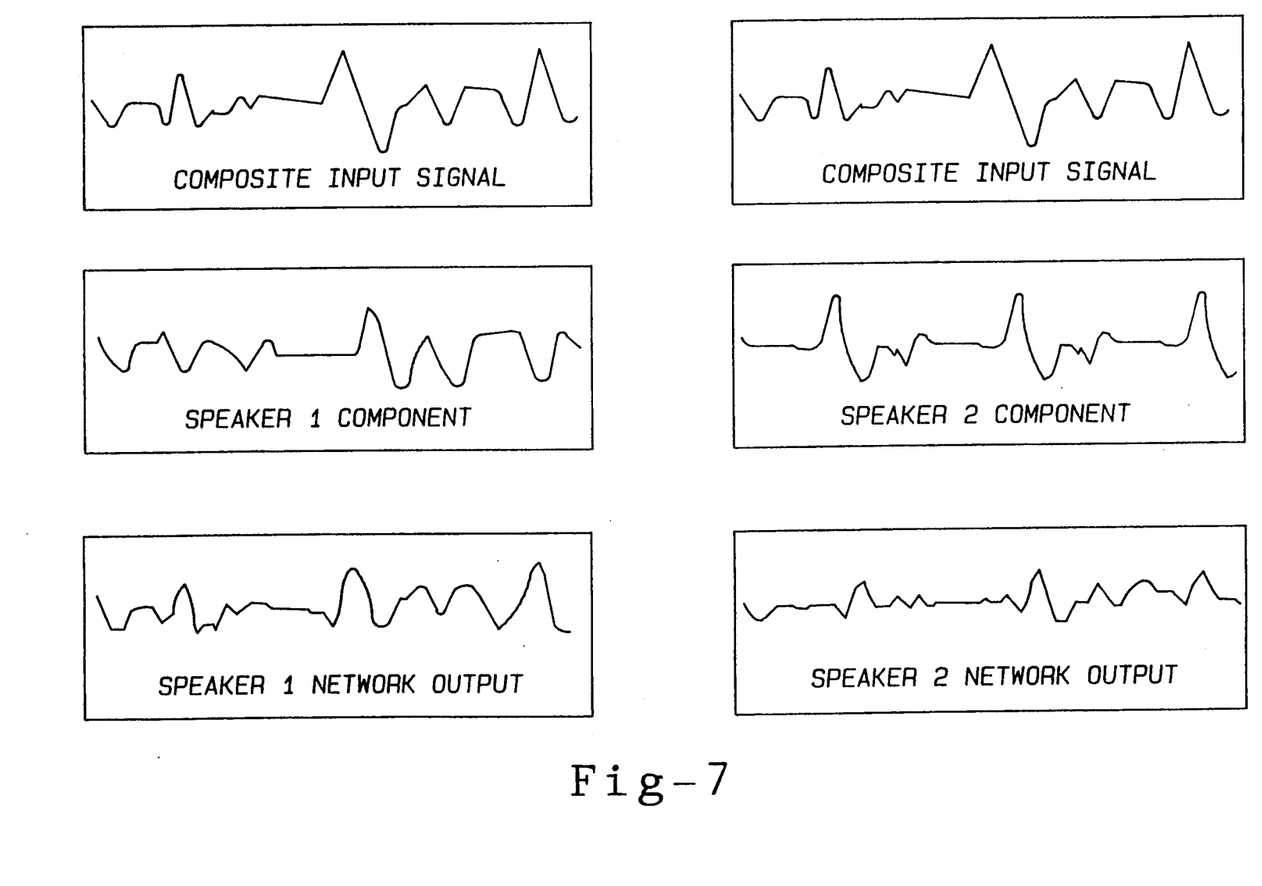
FIG. 7 is a graphical illustration of the results of the adaptive network for in-band signal separation after 100 training cycles.
Figure 8:
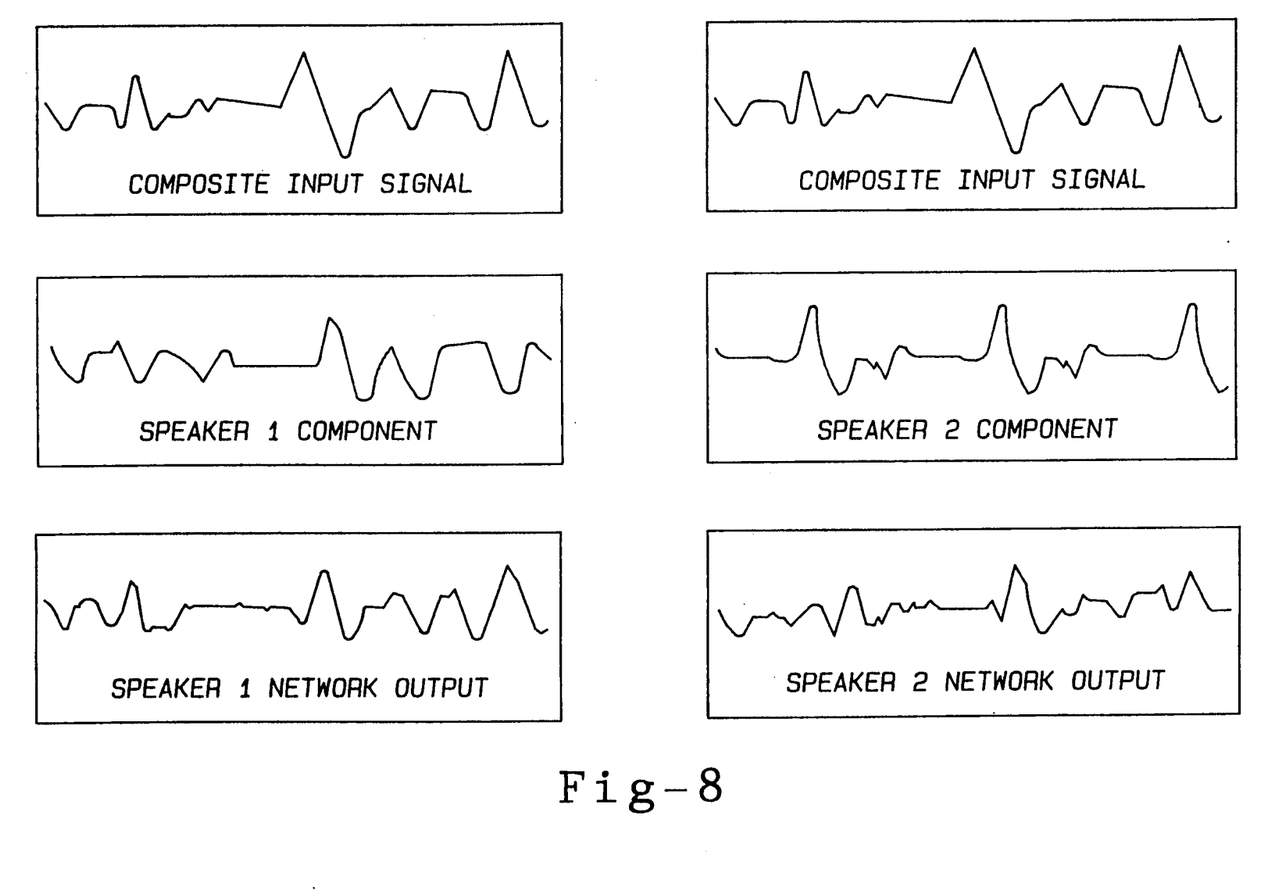
FIG. 8 is a graphical illustration of the adaptive network for in-band signal separation results after 300 training cycles.

After ten training cycles, as shown in FIG. 6, the speaker 1 and speaker 2 network outputs begin to show some significant distinguishing characteristics, particularly the speaker output. FIG. 7 shows the outputs after 100 training cycles, and both the speaker 1 and 2 outputs begin to appear to resemble the original component signals. After 300 cycles, as shown in FIG. 8, the outputs become very good approximations of the original component signals. The exact number of training cycles required will depend upon a number of factors, such as the complexity of the component signals and the desired fidelity of the outputs.

The trained adaptive network 26 can then be used to identify unknown composite signals to restore the original constituent signals if they are contained in the composite. In many cases the speaker and speaker 2 components used for training will be from speech by the same person or persons whose speech is in the unknown composite. It is also possible, however, to use the adaptive processor 26 in accordance with the present invention, to separate speech from unknown speakers. That is, by training an adaptive network 26 of sufficient complexity, a sufficient number of times, it is possible for it to "learn" the general characteristics of human speech so as to separate two examples of such speech from a single composite signal. It will be appreciated that an unsupervised, as opposed to supervised neural net may be preferred for this kind of application.

Once the processor 26 is trained, the weight values developed through training could be transferred to the processor having its weights fixed to none values. In this way, mass production of processors 26 is possible without repeating the training procedure.

It will be appreciated that while the composite signal 32 as shown in FIG. 1 consisted of the amplitudes of the raw signal in the time domain, the above techniques for the processor 26 could be employed in the frequency domain. That is, the input could be a frequency representation of the composite signal and the output also be some frequency representation. In this case, an inverse fourier transform could be used to restore the resultant signal.

In view of the foregoing, those skilled in the art should appreciate that the present invention provides an adaptive network for in-band signal separation 26 that can be used in a wide variety of applications. The various advantages should become apparent to those skilled in the art after having the benefit of studying specification, drawing and the following claims.

What is claimed is:

1. A signal processor for separating a composite signal into at least one of its constituent signals, said processor comprising:
   means for dividing said composite signal into discrete sampled portions;
   a plurality of neurons capable of receiving signals and producing an output signal said neurons including input neurons adapted to receive said sampled portions of said composite signal;
   a plurality of synaptic connection means providing a weighted interconnection between selected ones of said neurons;
   means for training said processor to produce an output that approximates at least one of said constituent signals, said training means including:
   (a) means for presenting a composite input training signal to selected ones of said neurons;
   (b) means for presenting a desired output, consisting of at least one of said constituent signals, to selected ones of said neurons; and
   (c) means for changing the strength of said synaptic connection means to cause said signal processor to produce said desired output in response to said training signal; and
   filter means for generating both low frequency and high frequency representations of said composite signal to present to said input neurons, wherein said low frequency representation includes a larger portion of said composite signal than said high frequency representation; and
   wherein said desired output consists of high frequency representation of at least one of said constituent signals, whereby said processor is capable of receiving both a high frequency and a low frequency portion of said composite signal during training and during processing.

2. The signal processor of claim 1 wherein said means for changing the strength of said synaptic connection means further comprises:
   means for computing the difference between said desired output and the actual output of said neurons, and means for adjusting said synaptic connections so as to minimize the difference between said desired output and the actual output.

3. The signal processor of claim 2 wherein said neurons are arranged in a series of layers including input, inner and output neuron layers forming a multilayer perceptron neural network.

4. The signal processor of claim 3 wherein the total number of said input neurons is at least equal to the number of said low frequency plus high frequency samples, and wherein the total number of output neurons is at least equal to the number of said high frequency samples.

5. The signal processor of claim 3 further comprising means for advancing said input signal through said input neurons in a stepwise fashion so that the entire composite signal from beginning to end is directed to each of said input neurons and an output is produced during each step of said stepwise advancing.

6. The signal processor of claim 1 wherein said composite signal received by the processor is a signal from a sensor, wherein the amplitude of the signal varies over time.

7. The signal processor of claim 6 wherein said constituent signals comprise speech signals.

8. The signal processor of claim 1 wherein said composite signal received by the processor is a signal from a sensor which is represented in the frequency domain.

9. The signal processor of claim 1 wherein said composite signal has two constituent signals and said desired output consists of both of said two constituent signals.

10. The signal processor of claim 1 wherein said constituent signals overlap each other in the frequency spectrum.

11. A neural network for separating a composite signal into at least one of its constituent signals, said network comprising:
   means for dividing said composite signal into discrete sampled portions;
   a plurality of neurons capable of receiving signals and producing an output signal said neurons including input neurons adapted to receive said sampled portions of said composite signal;

a plurality of synaptic connection means providing a weighted interconnection between selected ones of said neurons, said weighted connections being fixed and derived from a separate processor said separate processor including;

means for dividing said composite signal into discrete sampled portion;

a plurality of neurons capable of receiving signals and producing an output signal, said neurons including input neurons adapted to receive said sampled portions of said composite signal;

a plurality of synaptic connection means providing a weighted interconnection between selected ones of said neurons;

means for training said processor to produce an output that approximates at least one of said constituent signals, said training means including:

(a) means for presenting a composite input training signal to said neurons;

(b) means for presenting a desired output, consisting of at least one of said constituent signals, to selected ones of said neurons; and filter means for generating both low frequency and high frequency representations of said composite signal to present to said input neurons, wherein said low frequency representation includes a larger portion of said composite signal than said high frequency representation; and wherein said desired output consists of high frequency representation of at least one of said constituent signals, whereby said network is capable of receiving both a high frequency and a low frequency portion of said composite signal during training and during processing.

12. A method for separating a composite signal into at least one of its constituent signals said method comprising:

dividing said composite signals into discrete sample portions;

receiving said sampled portions in a plurality of neurons, said neurons including input neurons adapted to receive said sampled portions of said composite signal; and said neurons including output neurons adapted to produce output signals;

providing a weighted interconnection between selected ones of said neurons;

training said plurality of interconnected neurons to produce an output that approximates at least one of said constituent signals, said training including the steps of:

(a) presenting a composite input training signal to said neurons;

(b) presenting a desired output, consisting of at least one of said constituent signals, to selected ones of said neurons; and (c) changing the strength of said synaptic connection means to cause said output neurons to produce said desired output in response to said training signal; and generating both low frequency and high frequency representations of said composite signal to present to said input neurons, wherein said low frequency representation includes a larger portion of said composite signal than said high frequency representation; and wherein said output neurons produce an output that consists of a high frequency representation of at least one of said constituent signals, whereby said input neurons are capable of receiving both a high frequency and a low frequency portion of said composite signal during training and during processing.

13. A neural network produced in accordance with the method of claim 12.

* * * * *